United States Patent Office 3,426,039
Patented Feb. 4, 1969

3,426,039
PRODUCTION OF VICINAL EPISULFIDES BY THE OXIDE-CATALYZED REACTION OF AN ALKYLENE OXIDE AND A SULFUR-DONOR
Stephen W. Osborn, Yardley, and Edward Broderick, Perkasie, Pa., and Jose L. Villa, Cream Ridge, N.J., assignors to Thiokol Chemical Corporation, Bristol, Pa., a corporation of Delaware
No Drawing. Continuation of application Ser. No. 437,260, Mar. 4, 1965. This application Aug. 11, 1967, Ser. No. 660,139
U.S. Cl. 260—327     20 Claims
Int. Cl. C07d 59/00

ABSTRACT OF THE DISCLOSURE

The reaction of an alkylene oxide with a sulfur-donor in the presence of a catalytic amount of certain oxides, using a temperature in the range from about 100° C. and 300° C. and pressures such that the reaction is carried out at a space velocity in the range from about 150 to about 500 hours$^{-1}$, directly yields the corresponding vicinal episulfide in high yields. The products are useful as monomers for the production of moldable thermoplastic polymers.

---

This application is a continuation of copending application Ser. No. 437,260, filed. Mar. 4, 1965, now abandoned, which in turn is a continuation-in-part of copending application Ser. No. 375,371, filed June 15, 1964, now abandoned.

The present invention relates to a catalytic process for the preparation of vicinal episulfides. More particularly, it relates to a process involving the vapor phase reaction of an alkylene oxide with certain sulfur donating compounds in the presence of certain catalysts to form monomeric vicinal monoepisulfides.

This application is a continuation-in-part of our pending application, S.N. 375,371, filed June 15, 1964.

Vicinial monoepisulfides are a class of heterocyclic sulfur-containing compounds which may be represented by the structure:

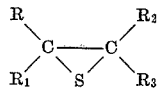

wherein R, $R_1$, $R_2$ and $R_3$ may be the same or different and may be H, an aryl group, or a lower linear or cyclic alkyl radical containing 1 to about 10 carbon atoms. These materials are also commonly referred to as alkylene sulfides. Examples of such compounds include monomeric materials such as ethylene sulfide, propylene sulfide, 1, 2 and 2, 3 butylene sulfide, isobutylene sulfide, styrene sulfide, and cyclohexene sulfide. These compounds may be polymerized to form moldable thermoplastic polymers which are useful in a variety of molded articles such as pipe, O-rings, gears and the like. See in this regard S.N. 165,034 filed Jan. 8, 1962, still pending; S.N. 168,836 filed Jan. 25, 1962, now abandoned, and S.N. 274,866 filed Apr. 22, 1963, now abandoned, in the names of Riad H. Gobran and Stephen W. Osborn. Furthermore, certain of these vicinal episulfides exhibit utility without further structural modifications, as insecticides and fungicides. See in this regard U.S. 2,225,573.

Durden et al., in the Journal of Organic Chemistry, 26, 836 (1961), report the preparation of ethylene sulfide and propylene sulfide by reacting the corresponding vicepoxide analogs, i.e., ethylene oxide and propylene oxide, with carbonyl sulfide in a vapor phase reaction in the presence of a lithium phosphate catalyst.

It is an object of the present invention to provide a novel method for the preparation of vicinal monoepisulfide.

It has now been unexpectedly found that certain classes of compounds or mixtures thereof are effective as catalysts in the preparation of vicinal monoepisulfides in the reaction between the corresponding alkylene oxides and certain sulfur donating compounds. These catalytically effective compounds, according to the present invention, may be broadly placed in the following categories (1) the alkali metal oxides and alkoxides, (2) the alkaline-earth metal oxides and alkoxides, (3) certain Mendeleefe Periodic Table Group III metal oxides and alkoxides, (4) certain silicon oxides, and (5) certain transition metal oxides. These compounds are preferably used, according to the present invention, in a high surface area or activated form. Although catalysts having surface areas of up to about 400 square meters per gram of catalyst may be employed, it is generally preferable, when a porous or activated type material can be prepared, to limit the surface area of the catalyst to about 20 square meters per gram of catalyst. Higher catalyst surface areas tend to undesirably degrade the sulfur containing reactant and, in addition, tend to be more easily posioned and therefore deactivated. The higher surface area catalysts may be advantageously employed, however, where high initial conversions are required and catalyst life is not paramount. The reaction is preferably conducted in the vapor phase.

Specific compounds which may be used as catalysts, according to the present invention, include: alkali metal oxides such as $Li_2O$, $Na_2O$, $K_2O$, $Rb_2O$ and $Cs_2O$; alkali metal alkoxides such as $NaOCH_3$, $LiOCH_3$ and $NaOC_2H_5$; alkaline-earth metal oxides such as $MgO$, $CaO$, $SrO$ and $BaO$; boron oxides such as $B_2O_3$; aluminum oxides such as $Al_2O_3$; aluminum alkoxides such as $Al[OCH(CH_3)_2]_3$ and $Al[OC(CH_3)_3]_3$; silicon oxides such as $SiO_2$; iron oxides such as $Fe_2O_3$ and nickel oxides such as NiO. The alkoxides may be defined generally by the formula: $M(OR)_n$ where M is a metallic element such as Li, Na, K, Rb, Cs, Al, Be, Mg, Ca and Sr. R is a lower alkyl group having about 1 to 4 carbon atoms and n is the valence of M.

Alumina and magnesia are the preferred catalysts according to the present invention and, as previously disclosed, may be used in the porous, high surface area form, or in the fused, low surface area form. Alumina, or $Al_2O_3$, which may exist in these several forms is selectively produced by the controlled heating of hydrated alumina. When $Al_2O_3 \cdot 3 H_2O$, which is an intermediate product in the Bayer process for the production of aluminum from Bauxite ore, is subjected to a temperature of about 600–800° C., the γ-or activated form of alumina is produced. This material may have a surface area of from about 180 to 400 square meters per gram. Upon further heating for several hours at a temperature of about 1250° C., the γ form is converted into the α form which has a lower surface area, i.e., about 0.1 to 10 square meters per gram. Tabular alumina is prepared by heating calcined alumina to a temperature not far below the fusion point. It has the crystalline form of the naturally occurring Corundum and a surface area of from about 0.1 to about 10 square meters per gram. Fused alumina or the so-called "Hengar Granules" is a form of $Al_2O_3$ which shows some catalytic activity but is primarily used as a catalyst support. From the standpoint of catalyst life, the α or lower surface area alumina is the preferred form. Porous magnesia, MgO, having a pseudomorphic structure, may be prepared by the thermal decomposition of $5MgO \cdot 4CO_2 \cdot 6H_2O$ at about 800° C. This form of magnesia has a surface area of about 21 square meters per gram and has been found to show good catalytic activity.

For practical as well as economical reasons, mixtures of the catalysts may be effectively utilized according to the present invention. Such mixtures of the catalysts may comprise either a physical intermingling of discrete particles of two or more of such catalysts to form a homogenous, particulate mixture or a mounting or dispersion of one or more of such catalysts on the external or internal surface of a second particle or pellet which second material acts as a support for the catalyst. This support may itself be a mixture of two or more of the catalysts of the present invention or it may consist of an inert material, such as carborundum or inert alumina. The catalytic, mounted oxide or alkoxide, or mixtures thereof, may, in some cases, activate or enhance the catalytic activity of a support oxide. Generally speaking, when preparing a supported catalyst system, according to the present invention, the oxide materials, either of the inert of catalytic type, are employed as supports and the alkoxide catalysts are mounted thereon. Reaction parameters and productivity requirements may, however, require the mounting of an oxide catalyst on an alkoxide catalyst. As used herein, the material being mounted on the base is termed the activator and the base is termed the support.

The alkylene oxides which may be used according to the present invention to form the analogous alkylene sulfides may be represented by the structure

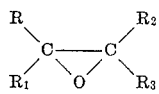

where R, $R_1$, $R_2$ and $R_3$ may be the same or different and may be H, an aryl group or a lower linear or cyclic alkyl group of from 1 to about 10 carbon atoms, depending on the desired alkylene sulfide product. Examples of such alkylene oxides are ethylene oxide, propylene oxide, 1,2- and 2,3-butylene oxide, isobutylene oxide, styrene oxide and cyclohexene oxide. Additionally, the alkylene oxide must be a gas, liquid or solid capable of being converted to the gaseous phase under the reaction conditions, i.e., temperature and pressure, employed in the process.

The sulfur donating compound which is reacted with the alkylene oxide according to the present invention should be a material which is a sulfur donor under the reaction conditions employed in the present process. It should be a material which will exist in a vapor state at the reaction conditions employed in the process of the present invention. These sulfur donating materials may be organic or inorganic in nature and would include such materials as COS, $CS_2$ and $H_2S$. Refinery gases, natural gases, coke oven gases, and the like, which contain $H_2S$ may be used as a source of $H_2S$. The sulfur-containing materials may be used alone or in combination with one another. The preferred of such sulfur-containing materials is COS since, with it, the best yields and conversions are obtained, all other factors remaining the same.

Although the reaction, according to the present invention, can be conducted when the mole ratio of the sulfur donating compound to the alkylene oxide is in the order of about 0.2:1 to 10:1, it is preferable that the ratio of the sulfur donating compound to the alkylene oxide be about 0.8:1 to 1.5:1. It is also preferable that an excess of sulfur donating compound, in respect to the amount of alkylene oxide being used, be utilized to prevent or reduce to a practical minimum the formation of alkylene oxide polymers since the predominating number of molecules of the sulfur donating compound will enhance or increase the possibility of reaction between such compounds and the alkylene oxide and correspondingly reduce the possibility of an epoxide polymerization reaction.

Since the reaction between the sulfur donating compound and the alkylene oxide preferably proceeds in the gaseous phase, certain reaction parameters, such as catalyst contact time, reactant gas volume and catalyst volume may be definitively considered in a single concept, i.e., space velocity. Those in the art usually define space velocity as the volume of combined reactant gases passing at standard temperature and pressure per unit time $(V/t)$ through a given volume of catalyst space $(v_c)$, i.e., space velocity is equal to $$\left(\frac{V}{t}\bigg/v_c\right) \text{ or } \left(\frac{V}{v_c t}\right)$$

Time is usually expressed in hours or more exactly, reciprocal hours since $t$ appears in the denominator of the expression. In the present invention, a space velocity of up to about 1500 volumes of combined reactant gases per volume of catalyst per hour may be utilized. Space velocity is more conveniently expressed as hours$^{-1}$. The preferable space velocity employed in the process of the present invention is from about 150 to about 500 hours$^{-1}$.

The oxide and/or alkoxide catalysts of the present invention may be contacted with the reactants, in a vapor or gaseous phase, using any of the common gas/solid contacting techniques which are usually used by those in the art and which are usually classified in terms of the condition in which the catalyst bed is employed. Thus, in this regard, the catalyst bed may be described as being static, moving or fluidized. When employing a static or fixed bed technique, the catalysts are preferably used as pellets, granules or spheres having a particle diameter of about 1/8" to about 3/8".

It is preferable that the catalysts of the present invention be utilized in an anhydrous condition, otherwise there is a tendency toward catalyst particle agglomeration and/or reactant and product degradation.

Atmospheric or autogenous pressure conditions have been found to be satisfactory in conducting the process of the present invention although reactor design factors and/or reactant vapor pressure consideration may influence this reaction parameter. It has been found that the reaction will proceed over a wide range of temperatures although a useful range of from about 100° C. to about 300° C. may be utilized most advantageously. Generally, however, it is preferable not to employ a temperature in excess of about 200° C. since above this temperature there is a tendency for the alkylene oxide reactant and the alkylene sulfide product to polymerize and/or for the compounds involved to degrade. The surface area of the catalyst also influences the choice of reaction temperatures employed. Generally, lower reaction temperatures are employed when using catalysts having higher surface area.

As can be seen from the hereinabove disclosed and described process, the present invention offers a versatile as well as utilitarian method for the preparation of vicinal episulfides. Process parameters can be varied over a wide range of values and conditions and any variation thereof is is to be construed as departing from the spirit and teachings of the present invention.

The following examples are merely illustrative of the present invention and are not to be deemed to be a limitation upon the scope thereof.

EXAMPLE 1

An apparatus was set up comprising an electrically heated glass reactor column equipped with a thermocouple well as a mixing chamber whereby the reactant gases, ethylene oxide and carbonyl sulfide, were mixed prior to being introduced into the column. Flow rate meters were coupled between the gas sources and the mixing chambers to measure the gas rectant flow. A sample tap-off was placed at the bottom of the column in order to sample the emerging reacted gases and subsequent analysis by a gas chromatographic technique. The catalytic reactor, 18 inches in length by 20 mm. internal diameter, was packed to a depth of 12 inches with α-alumina having a particle diameter of about 1/8 inch and a surface area of from about 5 to about 10 square meters per gram of catalyst. A thermocouple temperature sensing device was placed in the thermocouple well in order to monitor the reaction temperature. The column temperature was raised to about 200° C. and the apparatus was placed on stream by allowing the reactant gases to flow into the preheated reactor column. The mole ratio of COS to ethylene oxide was 1.2:1 and the flow rate of reactants adjusted to achieve a space velocity of about 166 hours$^{-1}$. After two hours, the peak mole percent conversion of ethylene oxide to ethylene sulfide reached about 25.4%.

EXAMPLE 2

The apparatus described in Example 1 was packed with a granular magnesium oxide catalyst and the temperature of the column raised to about 100° C. Carbonyl sulfide and ethylene oxide in a mole ratio of 1.6:1 were introduced into the reactor column at a space velocity of from about 150 hours$^{-1}$ to about 500 hours$^{-1}$. A gas chromatographic analysis of the emerging gases indicated a mole precent conversion of ethylene oxide to ethylene sulfide of about 12.9%.

EXAMPLE 3

The apparatus in Example 1 was charged with granular barium oxide, and the column temperature raised to about 200° C. The reactant gases, carbonyl sulfiide and ethylene oxide, were introduced into the reactor column in a mole ratio of 1.2:1 and at a space velocity as in Example 2. Analysis of the effiuent indicated the presence of ethylene sulfide.

EXAMPLE 4

The apparatus described in Example 1 was charged with fused alumina and the column temperature raised to about 250° C. The reactant gases, carbonyl sulfide and ethylene oxide, in a mole ratio of 1.7:1, were introduced into the reactor column at a space velocity as in Example 2. Analysis of the effluent gases indicated the presence of about 2.64% ethylene sulfide.

EXAMPLE 5

The apparatus in Example 1 was charged with a mixed catalyst comprising approximately 91% alumina and 6% silica. This mixed catalyst had a surface area of from about 210 to 250 sq. meters per gram. The reactant gases, carbonyl sulfide and ethylene oxide, were introduced into the reactor column in a mole ratio of carbonyl sulfide to ethylene oxide of approximately 1.2:1 and at a space velocity as in Example 2. The reactor column containing the mixed catalyst had previously been preheated to a temperature of about 100° C. A gas chromatographic analysis of the emerging effluent indicated the pressure of ethylene sulfide at a concentration of about 2.44 to 2.81%.

EXAMPLE 6

A modified α-alumina catatalyst having a surface area of 5 to 10 sq. meters per gram was prepared by treating the α-alumina with NaNO$_3$ solution followed by ignition to convert the nitrite to the oxide. The NaNO$_3$ comprised about 0.5% by weight of the catalyst composition. An apparatus as in Example 1 was charged with the above prepared catalyst and the temperature of the reactor raised to about 200° C. The reactant gases, carbonyl sulfide and ethylene oxide, were introduced into the reactor column in a mole ratio of carbonyl sulfide to ethylene oxide of about 1.2:1. All other reaction parameters were the same as in Example 1. A gas chromatographic analysis of the effluent gases indicated an ethylene oxide to ethylene sulfide conversion of about 17.65 mole percent to about 23.9 mole percent.

EXAMPLE 7

In this example, a catalyst was prepared comprising 11% NiO deposited on the surface of an activated alumina base. The surface area of the catalyst was about 64 sq. meters per gram of catalyst. The reactor column containing the catalyst was raised to a temperature of about 200° C. and the reactant gases, carbonyl sulfide and ethylene oxide, in a mole ratio of 1.2:1 were introudced into the reactor column at a space velocity as in Example 2. An analysis of the effluent indicated the presence of ethylene sulfide.

EXAMPLE 8

A catalyst was prepared comprising an alumina base on which about 5% Fe$_2$O$_3$ was mounted. The catalyst had a surface area of approximately 1 sq. meter per gram. The reactor column described in Example 1 was charged with the hereinabove described catalyst and the temperature of the reactor raised to about 200° C. The reactant gases, carbonyl sulfide and ethylene oxide, in a mole ratio of carbonyl sulfide to ethylene oxide of 1.2:1 were introduced into the reactor column at a space velocity as in Example 2. The apparatus was placed on stream and an analysis of the emerging cases indicated ethylene sulfide present in a concentration of about 4%.

EXAMPLE 9

A catalyst was prepared comprising a magnesium oxide support on which 1.25% sodium methoxide was dispersed as an activator. The apparatus described in Example 1 was charged with the above descirbed catalyst and the temperature of the reactor and catalyst raised to about 100° C. The reactant gases, carbonyl sulfide and ethylene oxide, an a mole ratio of 1.6:1 were introduced into the preheated reactor at a space velocity as in Example 2. A gas chromatographic analysis of the effluent indicated ethylene sulfide present at a concentration of about 4.59% or a mole precent conversion of ethylene oxide to ethylene sulfide of 16%.

EXAMPLE 10

A catalyst was prepared comprising of fused alumina (Hengar granules) support coated with 0.76% by weight sodium methoxide. A glass reactor column having a 20 mm. internal diameter was charged with approximately 6 inches of the above catalyst. The carbonyl sulfide and ethylene oxide gas reactants were employed in a mole ratio of carbonyl sulfide to ethylene oxide of 1:1.16, the flow rate of the ethylene oxide being 192 cc. per minute to give the system a space velocity of 590 hours$^{-1}$. The reactor column had previously been preheated to a temperature of 250° C. A gas chromatographic analysis of the effluent indicated a peak mole conversion of ethylene oxide to ethylene sulfide of 48%.

EXAMPLE 11

A catalyst was prepared comprising a fused alumina support coated with 1.55% sodium methoxide. A glass reactor column having an inside diameter of 20 mm. was charged with approximately 6 inches of the above prepared catalyst and the temperature of the catalyst and reactor raised to about 250° C. The reactant gases in this example were carbonyl sulfide and propylene oxide in a mole ratio of carbonyl sulfide to propylene oxide of about 2:1. The apparatus was placed on stream by allowing the reactant gases to pass through the reactor column. The flow of the propylene oxide being 80 cc. per minute thus giving the system a space velocity of 302 hours$^{-1}$. After two hours, a gas chromatographic analysis of the effluent indicated the presence of propylene sulfide in the effluent in a concentration of about 41.5% or a mole percent conversion of propylene oxide to propylene sulfide of 52.7%.

EXAMPLE 12

A catalyst was prepared comprising a fused alumina support coated with 1.55% sodium methoxide. A glass reactor column having an inside diameter of 20 mm. was charged with approximately 6 inches of the above prepared catalyst and the temperature of the reactor and catalyst raised to about 200° C. While the column was heating, ethylene oxide was bubbling through a flask of liquid carbon disulfide for an hour at 120 cc./min. The flask was put in a container of warm water to speed up the gaseous CS₂ flow. When this flow was analyzed, there was 59.5% of ethylene oxide and 40.5% of carbon disulfide. A gas chromatograph analysis of the effluent indicated ethylene sulfide present at a concentration of about 3%.

EXAMPLE 13

An apparatus for demonstrating a fluidized bed catalyst system was set up comprising a glass reactor column which was 10 inches in length and 1 inch in diameter and which was equipped with a mixing chamber whereby the reactant gases, ethylene oxide and carbonyl sulfide, were mixed prior to being introduced into the column. A heating tape was wrapped around the outside of the column for heating purposes and a stirrer activated by a motor was used to aid in fluidizing the catalyst. The stirrer was found to be useful due to the presence of a liquid by-product which was formed during the reaction which caused gumming up of the catalyst bed. Flow rate meters were coupled between the gas sources and the mixing chamber to measure the gas reactant flow. The gas inlet tube was placed at the bottom of the column in such a way that the incoming reactant gases would be passed upward through the fluidized catalyst bed. At the top of the reactor column a gas outlet tube conducted the reacted gases to a gas chromatograph for analysis. The catalyst bed, 6 inches in length and 1 inch in diameter, was composed of finely ground calcium oxide. The column temperature was raised to about 200° C. and the reactant gases were allowed to flow into the preheated reactor column. The mole ratio of carbonyl sulfide to ethylene oxide was 1.2:1 and the flow rate of the reactants was adjusted to achieve a space velocity of about 166 hours⁻¹. A gas chromatographic analysis of the emerging gases gave the following results:

| Time after instigation of reactant gas flow | Percent $CO_2$ | Percent COS | Percent EO [1] | Percent ES [2] |
|---|---|---|---|---|
| ½ hr | 6.55 | 61.3 | 27.2 | 5.23 |
| 1 hr | 11.3 | 58.0 | 24.5 | 6.45 |
| 1 hr. 25 min | 9.75 | 56.4 | 23.8 | 8.1 |

[1] EO = ethylene oxide.
[2] ES = ethylene sulfide.

The fluidized bed had a weight increase of 8.5 grams at the end of the run.

EXAMPLE 14

An apparatus as was used in Example 1 was used in the present experiment. Alumina pellets, ⅛″ in diameter, were used to form a 12 inch catalyst bed in the reactor. The column and the catalyst bed were heated to 200° C. H₂S and ethylene oxide were concurrently passed through the catalyst bed. The ethylene oxide was added to the reactor column at the rate of 176 cc./min. After 2 hours the temperature was set at 250° C. Samples of the exit gases under this condition, as determined by gas chromatographic analysis, showed CO₂, H₂S, ethylene oxide and ethylene sulfide to be present.

We claim:
1. A process for the production of a vicinal episulfide which comprises reacting an alkylene oxide with a sulfur-donor compound selected from the group consisting of carbonyl sulfide, carbon disulfide, and hydrogen sulfide, at a temperature in the range from about 100° C. to about 300° C. and in the presence of a catalytic amount of at least one oxide catalyst selected from the group consisting of lithium oxide, sodium oxide, potassium oxide, rubidium oxide, cesium oxide, magnesium oxide, calcium oxide, strontium oxide, barium oxide, nickel oxides, aluminum oxides, boron oxides, silicon oxides, and iron oxides, using pressures such that the reaction is carried out at a space velocity in the range from about 150 to about 500 hours⁻¹, thereby forming a vicinal episulfide corresponding to the alkylene oxide.

2. The process according to claim 1, in which the sulfur-donor is carbonyl sulfide.

3. The process according to claim 1 in which the sulfur-donor is carbon disulfide.

4. The process according to claim 1, in which the sulfur-donor is hydrogen sulfide.

5. The process according to claim 1, in which reaction occurs in the vapor phase.

6. The process according to claim 1, in which the reaction is conducted at a temperature in the range from about to 100° C. to about 200° C.

7. The process according to claim 1, in which the oxide catalyst is calcium oxide.

8. The process according to claim 1, in which the oxide catalyst is aluminum oxide.

9. The process according to claim 1, in which the oxide catalyst is magnesium oxide.

10. The process according to claim 1, in which the oxide catalyst is barium oxide.

11. The process according to claim 1, in which the oxide catalyst is sodium oxide.

12. The process according to claim 1, in which the catalyst is a mixture of $Al_2O_3$ and $SiO_2$.

13. The process according to claim 1, in which the alkylene oxide is ethylene oxide.

14. The process according to claim 1, in which the alkylene oxide is propylene oxide.

15. The process according to claim 1, in which the mole ratio of the sulfur-donor to the alkylene oxide is in the range from about 0.2:1 to about 10:1.

16. The process according to claim 15, in which the mole ratio of the sulfur-donor to the alkylene oxide is in the range from about 0.8:1 to about 1.5:1.

17. The process according to claim 1, in which the catalyst comprises an oxide catalyst adsorbed on alumina.

18. The process according to claim 17, in which the catalyst comprises sodium oxide adsorbed on alumina.

19. The process according to claim 17, in which the catalyst comprises nickel oxide adsorbed on alumina.

20. The process according to claim 17, in which the catalyst comprises ferric oxide adsorbed on alumina.

References Cited

UNITED STATES PATENTS 3,073,846  1/1963  Millikan _____ 260—348
3,213,108  10/1965  Osborn et al. _____ 260—327

JAMES A. PATTEN, *Primary Examiner.*

U.S. Cl. X.R.

260—79.7

Notice of Adverse Decision in Interference

In Interference No. 97,061 involving Patent No. 3,426,039, S. W. Osborn, E. Broderick and J. L. Villa, PRODUCTION OF VICINAL EPISULFIDES BY THE OXIDECATALYZED REACTION OF AN ALKYLENE OXIDE AND SULFUR-DONOR, final judgment adverse to the patentees was rendered Dec. 16 1970, as to claims 1, 2, 3, 5, 7, 10, 13 and 14.

[*Official Gazette February 16, 1971*].